Patented Apr. 19, 1932

1,854,291

UNITED STATES PATENT OFFICE

CHARLES L. BURDICK, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

FERTILIZER MANUFACTURE

No Drawing. Application filed January 24, 1930. Serial No. 423,252.

This invention relates to fertilizers, more particularly to phosphatic fertilizers containing nitrogen and methods for the production thereof.

The normal method of manufacturing superphosphate fertilizers consists in decomposing phosphate rock with a mineral acid and curing the resultant product. The dissolving action of the acid upon the rock develops considerable heat giving rise to temperatures as high as about 90° C. Therefore, when the reaction is carried out with nitric acid, which is appreciably decomposed at temperatures in excess of about 60° C., there is a wasteful and obnoxious evolution of nitrogen oxides.

Moreover, as is well known, the tricalcium phosphate in the rock is associated with non-phosphatic constituents, such as calcium carbonate and calcium fluoride, which, when the rock is subjected to treatment with nitric acid, are largely decomposed with evolution of gases, chiefly carbon dioxide and silicon fluorides. Furthermore, I have observed that the escape of these gases from the reaction mass serves to somewhat accelerate the emission of nitrogen oxides therefrom and as a result an added evolution of the carbon dioxide and other gaseous reaction products of the non-phosphatic ingredients of the rock is accompanied by a corresponding increase in the proportions of nitrogen oxides evolved. It will be evident, therefore, that the loss attending the escape of the aforesaid gases becomes increasingly important in the decomposition of a low grade rock high in carbonates and fluorides. For example, the losses arising from the escape of carbon dioxide alone in the decomposition of a phosphate rock containing 8% by weight and one containing 20% by weight calcium carbonate are about 3.5% and 9.0% respectively based upon the original weight of the rock. These figures do not include the losses resulting from the evolution of gaseous fluorides or nitrogen oxides, hence the actual loss of evolved gases is considerably greater than indicated above. Therefore, it is not surprising that a low grade phosphate rock, that is, a phosphate rock high in carbonates and/or fluorides, is relatively little used in commercial processes for manufacturing phosphate fertilizers.

Accordingly, in view of the foregoing considerations, it is the object of the present invention to provide a new and improved process for the production of nitrogenated phosphate fertilizers.

It is a further object of the invention to produce a phosphatic fertilizer high in available nitrogen from phosphate rock, nitric acid and ammonia.

Another object of the invention is to render feasible the use of low grade phosphate rock in the manufacture of nitrogenous phosphate fertilizers of the above-described character.

Additional objects and advantages of the invention will be apparent as it is better understood by reference to the following specification in which its details and preferred embodiments are described.

In accordance with the present invention I produce a phosphatic fertilizer high in available nitrogen by reacting phosphate rock with the nitric acid, while recovering the gases evolved during the decomposition and employing them in part or in toto together with ammonia in subsequent reaction with the decomposed rock. By adding ammonia to the decomposition product a two-fold advantage is obtained in the neuutralization of the free acid and the introduction of a valuable fertilizing ingredient, thereby producing a fertilizer relatively high in available phosphorus and nitrogen and otherwise suitable with regard to chemical character. The gases arising from the decomposition, on the other hand, are particularly useful in ameliorating the physical properties of the product to yield a fertilizer well adapted to the requirements of storage, shipment and distribution. They also permit the introduction of more ammonia into the product for the same degree of reversion to citrate insoluble $P_2O_5$ than is possible when using ammonia alone. Thus, by utilizing the gases evolved during the decomposition stage for the later treatment of the decomposition product during ammoniation, a considerable saving and economy of otherwise by-product or waste materials may be effected, while obtaining a fertilizer of enhanced value both as to physical and chemical character. Moreover, since the present invention is particularly well adapted to the use of low grade rock, it makes possible the utilization in fertilizer manufacture of phosphate rock, high in carbonates and/or fluorides, previously considered to be of little commercial value. A low grade phosphate rock, as referred to in the present specification, is one containing a total calcium carbonate and fluoride content in excess of about one mole per mole of $P_2O_5$.

The proportions of nitric acid employed in the decomposition stage may be varied within relatively wide limits depending largely upon the chemical nature of the phosphate rock and the desired chemical content of the final product. Thus, I may employ sufficient acid to react with the non-phosphatic ingredients of the rock and to decompose the tricalcium phosphate to water soluble calcium phosphate, thereby obtaining a product containing water soluble calcium phosphate, calcium nitrate and some free acid. However, if desired the proportions of acid used may be somewhat less than or in excess of the total acid required to react with the non-phosphatic ingredients of the rock and to decompose the tricalcium phosphate to water soluble calcium phosphate. Generally speaking, it is desirable for the most satisfactory results that the amount of nitric acid employed should correspond to from about 3 to 6 moles of $HNO_3$ per mole of $P_2O_5$ in the rock plus the amount of acid chemically equivalent to the non-phosphatic constituents contained therein.

Ammonia is added to the resultant product preferably as anhydrous gaseous or liquid ammonia although aqueous ammonia may be used, the proportions employed being subject to considerable variation depending largely upon the desired physical form and chemical content of the final product. For example, I may treat the decomposed rock with sufficient ammonia to neutralize the free acid and to convert a part or all of the water soluble calcium phosphate to citrate soluble calcium phosphate, which latter reaction, in the presence of the gases evolved during the decomposition and introduced during this (the ammoniation) stage of the process, may be illustrated by the following equation:

I. 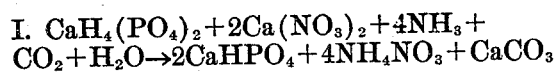
$CaH_4(PO_4)_2 + 2Ca(NO_3)_2 + 4NH_3 + CO_2 + H_2O \rightarrow 2CaHPO_4 + 4NH_4NO_3 + CaCO_3$ However, inasmuch as calcium nitrate is normally present in the decomposition product in excess of the above stoichiometrical proportions due to the reaction of nitric acid with the non-phosphatic ingredients of the rock, I may employ larger quantities of ammonia to convert substantially all of the calcium nitrate to ammonium nitrate, thus:

II. 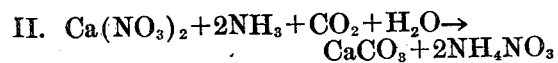
$Ca(NO_3)_2 + 2NH_3 + CO_2 + H_2O \rightarrow CaCO_3 + 2NH_4NO_3$ or I may use even higher proportions of ammonia to convert the mono- or dicalcium phosphates to mono- or diammonium phosphates which will be associated with more or less reverted tricalcium phosphate.

As previously indicated, the gases evolved during the decomposition stage of the process are re-incorporated wholly or in part into the reaction product during the ammoniation stage. This may be accomplished by introducing these gases, chiefly fluorides and carbon dioxide, along with the ammonia; or the ammonia may first be allowed partially to react with the decomposition product, the carbon dioxide, etc., being introduced in the later stages of ammoniation. For example, I may react sufficient nitric acid with a low grade phosphate rock, such as Spanish coprolites, Belgium phosphatic chalk or South Carolina nodular phosphorites, to obtain a decomposition product containing water soluble calcium phosphate, calcium nitrate and some free acid, while recovering the nitrogen oxides, carbon dioxide and other gases evolved during the decomposition. Then, the decomposition product may be treated with ammonia to neutralize the free acid and to convert say one-half of the calcium nitrate to ammonium nitrate, as follows:

III. 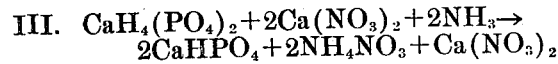
$CaH_4(PO_4)_2 + 2Ca(NO_3)_2 + 2NH_3 \rightarrow 2CaHPO_4 + 2NH_4NO_3 + Ca(NO_3)_2$ thereafter the gases evolved during the initial stages of the decomposition and further ammonia being introduced to precipitate insoluble calcium salts and react with the remaining portion of the calcium nitrate respectively, for instance, as shown above by Equation II. The product thus obtained is relatively high in available phosphorus and nitrogen and of good physical form, and furthermore, contains both nitrate and ammonia nitrogen which are of demonstrated high value in the stimulation of plant growth during the various stages of plant life.

My process, moreover, while particularly applicable to the treatment of a low grade phosphate rock, may be applied to a high grade rock. However, it will be recognized that as the proportions of carbonates and fluorides in the rock decrease, the amount of the carbon dioxide, etc., evolved from this source likewise diminishes; hence, the quantities of these gases recovered from the decomposition and introduced during the ammoniation stage, although relatively large and worthy of economic consideration, may yet be insufficient to meet the requirements thereof in obtaining a product of good physical character. Therefore, when employing high grade rock, it may be desirable to use additional carbon dioxide over that resulting directly from the decomposition, this being derived from any convenient source, for example, as a by-product of fermentation processes.

While it is to be understood that the invention herein described is susceptible of considerable variation as regards proportions of materials and specific conditions of operation, the following examples will serve to illustrate how the invention may be practiced.

*Example 1.*—One hundred eighty parts by weight of 50% nitric acid is reacted, while mixing, with 100 parts by weight of a typical low grade South Carolina nodular phosphorite having the following composition:

Per cent
60.0 tricalcium phosphate
20.0 calcium carbonate
7.0 calcium fluoride
3.0 iron and aluminum oxides
6.0 silica
4.0 other ingredients 100.0

The amount of acid indicated is approximately sufficient to decompose the tricalcium phosphate to water soluble phosphate and react with the other ingredients of the rock to yield a decomposition product containing water soluble calcium phosphate, calcium nitrate and some free acid. The gases evolved during the decomposition are collected for use during the ammoniation of the resultant product. Two hundred fifty parts by weight of the decomposed rock is treated with 13 parts by weight of ammonia gas, the evolved gases and vapors from the first stage of the process, namely, carbon dioxide, nitrogen oxides, fluorides, etc., being added to the reaction mixture after the introduction of about one-half of this quantity of ammonia. Inasmuch as the total quantity of ammonia employed approximately corresponds to four moles of $NH_3$ per mole of water soluble $P_2O_5$ plus that amount of ammonia chemically equivalent to the free acid in the decomposed rock, the phosphoric acid in the final product is combined largely as citrate soluble calcium phosphate. Furthermore, the carbon dioxide recovered from the decomposition treatment with nitric acid is in itself of sufficient amount to satisfy the requirements of the decomposition gases in the reaction with ammonia, as exemplified by Equation I.

*Example 2.*—One hundred fifty parts by weight of 50% nitric acid is reacted, with mixing, with 100 parts by weight of a relatively high grade phosphate rock having the following composition:

Per cent
67.0 tricalcium phosphate
9.0 calcium carbonate
2.5 calcium fluoride
3.6 iron and aluminum oxides
17.9 other constituents 100.0

Two hundred thirty-five parts by weight of the decomposition product, containing about 50.0 parts of $CaH_4(PO_4)_2$ and 91.0 parts of $Ca(NO_3)_2$ is treated, with mixing, with about 15 parts of ammonia, the recovered gases evolved during the decomposition of the rock and 4.8 parts of carbon dioxide in addition. The resultant product analyzes, with respect to fertilizing ingredients, about 13.0% total $NH_3$ (of which almost 7.6% is nitrate $NH_3$) and 11.7% $P_2O_5$. Close to 8.0% calcium carbonate is also present, which, although to some extent an inert material in fertilizers, is of recognized high value in eliminating soil acidity.

Fertilizers manufactured in accordance with the present invention are desirable not only because of their high nitrogen content but also because they contain lower proportions of reverted tricalcium phosphate than may be obtained by the use of ammonia alone. This may be explained on the basis that by reacting the fluorides, carbon dioxide, etc., with the decomposition product, a part of the calcium is combined in the form of insoluble and relatively unreactive calcium salts, thereby preventing to a large extent the reversion of mono- or dicalcium phosphates to tricalcium phosphate. Moreover, that the resultant product is relatively stable and otherwise characterized by good physical form may be largely attributed to the presence of the calcium carbonate and calcium fluoride incorporated therein by the reaction of the decomposition gases with the decomposed rock during ammoniation.

As previously indicated, all of the gases recovered from the decomposition stage may be returned to the reaction product during the ammoniation or, if desired, only a part of them may be reincorporated into the final product, the remaining portion being used in any suitable manner for the production of commercial products. For example, it may be desirable to partially or completely separate the fluoride compounds from the evolved gases, employing only the remaining gases in the later treatment of the decomposition product.

It will be understood that other fertilizing or inert materials may be incorporated into the fertilizers produced in accordance with the present invention by addition thereto either before, during, or after ammoniation.

Various changes may be made in the method described without departing from the invention or sacrificing any of the advantages thereof.

I claim:

1. The process of producing a phosphatic fertilizer high in available nitrogen by reacting phosphate rock with nitric acid, while recovering the gases evolved during the decomposition and employing them together with ammonia in subsequent reaction with the decomposed rock.

2. The process of producing a phosphatic fertilizer high in available nitrogen by decomposing phosphate rock with about 3 to 6 moles of $HNO_3$ per mole of $P_2O_5$ in the rock plus that amount of acid chemically equivalent to the non-phosphatic constituents thereof, while recovering the gases evolved during the decomposition and employing them together with ammonia in subsequent reaction with the decomposed rock.

3. The process of producing a phosphatic fertilizer high in available nitrogen by decomposing phosphate rock with nitric acid to yield a product containing water soluble calcium phosphate, calcium nitrate and some free acid, while recovering the gases evolved during the decomposition and employing them together with ammonia in subsequent treatment of the aforesaid decomposition product, using sufficient proportions of ammonia to neutralize the free acid and to convert at least a part of the water soluble calcium phosphate to citrate soluble calcium phosphate.

4. The process of producing a phosphatic fertilizer high in available nitrogen by decomposing phosphate rock with nitric acid to yield a product containing water soluble calcium phosphate, calcium nitrate and some free acid, while recovering the gases evolved during the decomposition and employing them together with ammonia in subsequent treatment of the aforesaid decomposition product, using sufficient proportions of ammonia to neutralize the free acid and to convert substantially all of the water soluble calcium phosphate to citrate soluble calcium phosphate.

5. The process of producing a phosphatic fertilizer high in available nitrogen by decomposing phosphate rock with nitric acid to yield a product containing water soluble calcium phosphate, calcium nitrate and some free acid, while recovering the gases evolved during the decomposition and employing them together with ammonia in subsequent treatment of the aforesaid decomposition product, using sufficient proportions of ammonia to neutralize the free acid and to convert substantially all of the calcium nitrate to ammonium nitrate.

6. The process of producing a phosphatic fertilizer high in available nitrogen by reacting nitric acid with a phosphate rock having a total calcium carbonate and fluoride content in excess of one mole per mole of $P_2O_5$, while recovering the gases evolved during the decomposition and employing them together with ammonia in subsequent reaction with the decomposed rock.

7. Process of producing a fertilizer which comprisess decomposing phosphate rock with nitric acid to yield a product containing water soluble calcium phosphate, calcium nitrate, and some free acid, recovering the gases evolved during the decomposition, treating the decomposed rock with ammonia and thereafter with said recovered gases and ammonia, the total ammonia corresponding to at least about four mols of ammonia per mol of water soluble $P_2O_5$ in the decomposed rock.

In testimony whereof, I affix my signature.

CHARLES L. BURDICK.